United States Patent

Seshita et al.

[11] Patent Number: 5,210,928
[45] Date of Patent: May 18, 1993

[54] METHOD OF MANUFACTURING AN ELECTRIC MOTOR

[75] Inventors: Takashi Seshita; Noriyuki Niimura, both of Shimotsuga, Japan

[73] Assignee: Hitachi, Ltd., Tokyo, Japan

[21] Appl. No.: 744,400

[22] Filed: Aug. 13, 1991

[30] Foreign Application Priority Data

Aug. 15, 1990 [JP] Japan .................. 2-214257

[51] Int. Cl.$^5$ ............................................. H02K 15/06
[52] U.S. Cl. ........................................ 29/596; 29/872; 219/10.43
[58] Field of Search ............. 29/596, 867, 426.4, 29/872; 219/10.41, 10.43

[56] References Cited

U.S. PATENT DOCUMENTS 3,832,767 9/1974 Petree .................................. 29/867
5,113,574 5/1992 Nuss .................................... 29/597

FOREIGN PATENT DOCUMENTS 61-63378 4/1986 Japan .

*Primary Examiner*—Carl E. Hall
*Attorney, Agent, or Firm*—Antonelli, Terry, Stout & Kraus

[57] ABSTRACT

A method of connecting an end portion of an enameled wire forming a winding of an electric motor to one end of a conductor of a lead includes the steps of heating an enamel coating on the end portion of the enameled wire by a high-frequency current to separate the enamel coating from a conductor of the enameled wire, and removing the separated enamel coating to expose a corresponding end portion of the conductor of the enameled wire. The enameled wire thus processed is wound around the outer peripheral surface of the insulating layer of the lead to form a few turns, and the exposed end portion of the conductor of the lead is then wound around the exposed end portion of the conductor of the enameled wire to form a connection. Thereafter, the two conductors are welded together at an end of the connection by TIG welding, thereby completing the connection.

9 Claims, 9 Drawing Sheets

METHOD OF MANUFACTURING AN ELECTRIC MOTOR

BACKGROUND OF THE INVENTION

This invention relates to an electric motor and a method and an apparatus for manufacturing the electric motor and, more particularly, to the structure of a connection between an enamel-coated wire (hereinafter referred to as "enameled wire") forming a winding of an electric motor and a lead and a method and an apparatus for forming the connection.

An electric motor has at least one winding which is ordinarily formed of an enameled wire. The electric motor also has leads for connecting the ends of the winding to a power source. According to the prior art, when leads are connected to the winding, a preparatory operation of removing an enamel coating from end portions of the enameled wire to which the leads are to be connected is performed based on a method such as that as shown in FIG. 5 or 6. In the conventional enamel removing method shown in FIG. 5, an end portion 31a of an enamel coating 31 of an enameled wire 30 is forcibly stripped off a conductor 32 by stripping with knife edges 35 while the enameled wire 30 is retained by a fixing member 34. In the conventional enamel removing method shown in FIG. 6, metallic brushes 36 or grinding stones (not shown) are rotated to scrape enamel off a conductor 32 of an enameled wire 30 at an end portion 31a. Means for removing, enamel other than those shown in FIGS. 5 and 6, for example, means for burning enamel b flame to remove the enamel and means for removing enamel by a chemical remover are known.

In the prior art, enameled wire 30 with enamel coating stripped from its end portions by such means is wound around a lead 7, as shown in FIGS. 7 and 8. Then, end portions of conductors 32 and 6 of the wires 30 and 7 are welded together as at 8 in the method shown in FIG. 7, or the conductors 32 and 6 are connected by a brazing material 9 in the method shown in FIG. 8. The conventional method shown in FIG. 7, however, has a problem that the conductor 32 is melted by the welding heat at a portion 15 of the conductor 32 adjacent to the welded portion 8 so that this portion is reduced in diameter or the mechanical strength of the wire is reduced by thermal stress, and there is therefore a risk of an occurrence of disconnection during operation of the electric motor. The conventional method shown in FIG. 8 also has a problem of melting and a reduction in the thickness of a portion 16 of the conductor 32 adjacent to the brazing material 9 caused by heating during brazing, with a resultant risk of disconnection.

Each of the above-mentioned conventional enamel removing means badly influences the conductor so as to reduce the connection strength of portions connected by brazing or soldering, resulting in a reduction in the reliability of the connection. Further, it is difficult to accurately control the length of the enamel coating to be stripped. Because of these problems, automatization of connecting operations is difficult. That is, in the case of the enamel removing means shown in FIG. 5, there are large possibilities that the conductor 32 of the portion stripped of enamel is scraped together with enamel 31 so that its cross-section is reduced and that the stripping knife edges 35 bite into the conductor 32 and draw the same since the knife edges scrape off the enamel 30 while the enameled wire 31 is retained by the fixing portion 34. In the case of the..enamel removing means shown in FIG. 6, it is likely that the conductor 32 is ground and damaged or reduced in thickness when the enamel 31 is scraped off, and that a force in a rotational direction is applied to the enameled wire 30 so that enameled wire 30 is wrung. In the case of the means for removing enamel by burning in flame, the conductor is oxidized by flame, so that the connection strength is reduced and the connection reliability is considerably reduced if leads are connected by brazing or soldering. In addition, enamel is removed excessively out of the desired enamel removing range. In the case of the means for removing enamel by melting the enamel by a chemical remover, the surface of the conductor is corroded, so that the strength of the brazed or soldered connection is reduced. In addition, it is difficult to accurately adjust the length of the enamel to be removed.

SUMMARY OF THE INVENTION

It is an object of the present invention to solve the above-described problems.

It is another object of the present invention to provide an electric motor having an improved structure of a connection between an enameled wire forming a winding and leads.

It is still another object of the present invention to provide an improved method of connecting an enameled wire forming a winding of an electric motor to leads.

It is a further object of the present invention to provide an improved apparatus for connecting an enameled wire forming a winding of an electric motor to leads.

According to one aspect of the present invention, there is provided an electric motor comprising at least one winding formed of an enameled wire having a first conductor and an insulating enamel coating on an outer peripheral surface of the conductor; a terminal; and a lead for electrically connecting the terminal to the winding, the lead having a second conductor and an insulating layer formed on an outer peripheral surface of the second conductor; wherein the enamel coating of the enameled wire of the winding is removed over a first length from an end of the enameled wire so that an end portion of the first conductor is exposed over the first length, the insulating layer of the lead is removed over a second length from an end of the lead so that an end portion of the second conductor is exposed over the second length, and the exposed end portion of the second conductor is wound around the peripheral surface of the exposed end portion of the first conductor to form a connection between the lead and the enameled wire, the first and second conductors being bonded together at the connection by one of welding and soldering.

According to another aspect of the invention, there is provided a method of manufacturing an electric motor comprising the steps of preparing at least one winding formed of an enameled wire having a first conductor and an insulating enamel coating on an outer peripheral surface of the conductor; preparing a lead for electrically connecting an end of the enameled wire to a terminal of the motor, the lead having a second conductor and an insulating layer formed on an outer peripheral surface of the second conductor, the insulating layer being removed at an end of the lead so that an end portion of the second conductor is exposed; heating the enamel coating on the end portion of the enameled wire of the winding by a high-frequency current to separate the enamel coating on the end portion from the first conductor; removing the thus separated enamel coating to expose the corresponding end portion of the first conductor; winding the exposed end portion of the second conductor around an outer peripheral surface of the exposed end portion of the first conductor to form a connection between the enameled wire and the lead; and bonding the first and second conductors at the connection by one of welding and soldering.

According to still another aspect of the present invention, there is provided an apparatus for connecting at least one electric motor winding formed of an enamelded wire having a first conductor and an insulating enamel coating on an outer peripheral surface of the conductor, to a lead for electrically connecting an end of the winding to a terminal of the motor, the lead having a second conductor and an insulating layer formed on an outer peripheral surface of the second conductor, the insulating layer being removed at an end of the lead so that an end portion of the second conductor is exposed, the apparatus comprising enamel separating means for heating the enamel coating on an end portion of the enameled wire of the winding by a high-frequency current to separate the enamel coating on the end portion from the first conductor; enamel removing means for removing the thus separated enamel coating to expose the corresponding end portion of the first conductor; conductor winding means for winding the exposed end portion of the second conductor around an outer peripheral surface of the exposed end portion of the first conductor to form a connection between the enameled wire and the lead; and means for bonding the first and second conductors at the connection by one of welding and soldering.

In the electric motor in accordance with the present invention, because the end portion of the conductor of the lead is wound around the corresponding exposed end of the conductor of the enameled wire of the winding to form a connection, the conductor of the enameled wire includes a core of the connection and, thus, is prevented from being easily damaged by the heat of welding or soldering when these conductors are bonded by welding or soldering at the connection. Although the conductor of the lead is exposed outside the connection, a group of fine wires which constitute the conductor of the lead and which are much finer and flexible than the conductor of the enameled wire are sufficiently resistant to vibrations of the electric motor and free from disconnection during motor operation after the completion of the welding or soldering, even if the fine wires are influenced by the heat of the welding or brazing. The connection is thus improved in reliability.

In the method and apparatus in accordance with the present invention, the enamel coating of the enameled wire forming the winding of the electric motor is heated and swollen or expanded by the heat of the high-frequency current and thus separated from the conductor of the enameled wire and is thereafter removed from the enameled wire. There is, therefore, no risk of damage to the surface of the conductor of the enameled wire or of oxidation thereof due to the heating. The method and apparatus in accordance with the present invention thus contribute to the formation of a connection having a sufficiently high mechanical strength and improved electric conduction performance.

Preferably, after the exposed conductor end portion of the lead has been would around the exposed conductor end portion of the enameled wire, the two conductors are welded together by TIG welding at an extreme end of the connection. By TIG welding, the two conductors can be welded without being oxidized and, in addition, the welding heat is prevented from acting upon a portion of the connection beyond the welded region of the connection.

The above and other objects, features and advantages of the present invention will become more apparent from the following description with reference to the accompanying drawings.

BRIEF DESCRIPTION OF THE DRAWINGS

Figure 1:
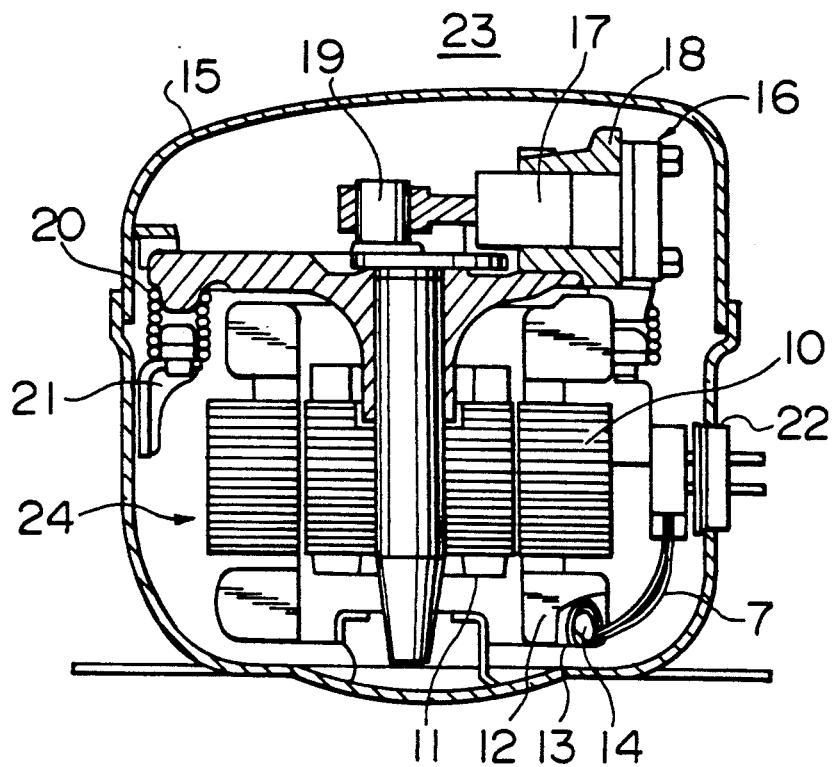
FIG. 1 is a axial sectional view of a closed refrigerant compressor having an electric motor in accordance with the present invention.
Figure 2:
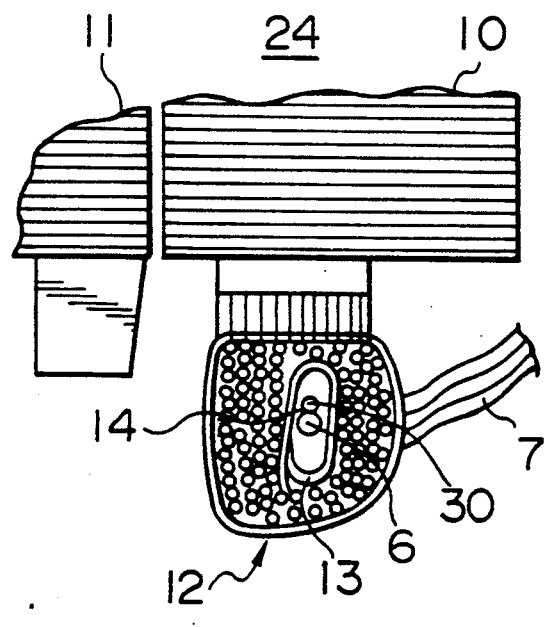
FIG. 2 is an enlarged fragmentally sectional view of the stator and the rotor of the electric motor shown in FIG. 1.
Figure 3:
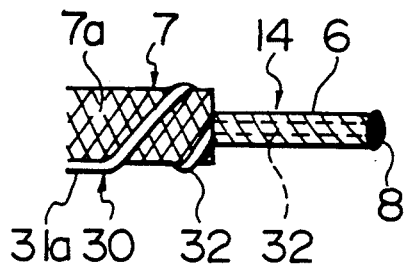
FIG. 3 is an enlarged side view of a connection between an end of an enameled wire forming the winding of the stator and an end of a lead.

Referring to FIGS. 1 to 3, an electric motor 24 in accordance with the present invention is shown as applied to a closed type compressor 23. That is, a compression mechanism 16 having a piston 17 and a cylinder 18 is elastically supported by springs 20 on brackets 21 in a closed casing 15. The electric motor 24 is disposed in the casing 15 and has a stator 10 and a rotor 11. The rotor 11 is connected to a crankshaft 19 for reciprocatively driving the piston 17. The stator 10 has a winding 12 which is electrically connected to a terminal 22 by leads 7. The winding 12 is formed of an enameled wire 30. Connections 14 of end portions of the enameled wire 30 and the leads 7 are covered with an insulating member 13 and are inserted and fixed in the winding 12 together with the insulating material 13.

The enameled wire 30 and the leads 7 have portions which extend generally parallel to each other. The enameled wire 30 and the leads 7 are connected electrically and mechanically at ends of these parallel portions That is, each lead 7 is stripped of an insulating layer 7a at its one end, so that a conductor 6 formed of a multiplicity of thin wires is exposed. The enameled wire 30 forming the winding 12 is stripped of an enamel coating 31a at its end by method and apparatus to be described later, so that a conductor 32 of the wire 30 is exposed. The exposed conductor 6 of each lead is wound around a corresponding exposed end portion of the conductor 32 of the enamelded wire 30, and the conductors 6 and 32 are welded together at their extreme ends 8, thus forming a connection 14. A portion of the enameled wire 30 adjacent to the connection 14 is wound one or two turns around the insulating layer 7a of the lead 7.

Figure 4:
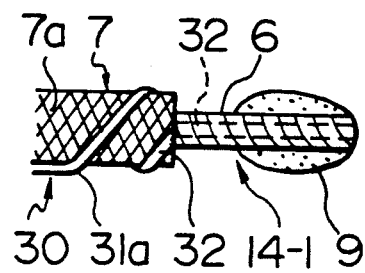
FIG. 4 is an enlarged side view of a modification of the connection shown in FIG. 3.
Figure 5:
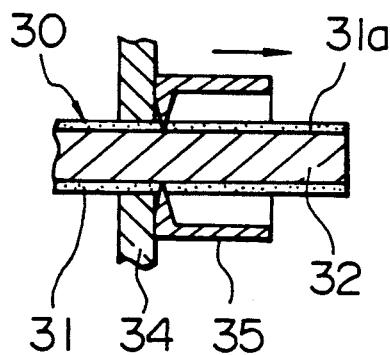
FIGS. 5 and 6 are sectional view and side view of the conventional means for removing the enamel coating from enameled wires, respectively.
Figure 6:
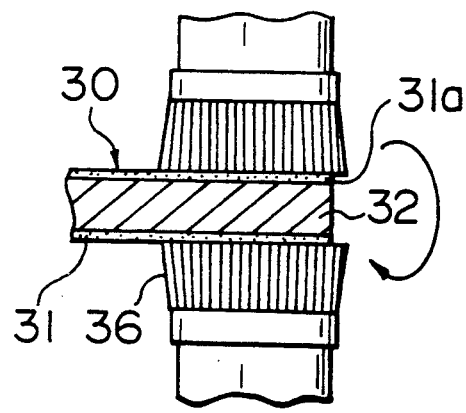
Figure 7:
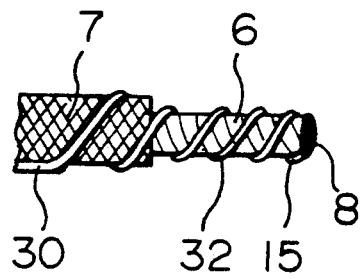
FIGS. 7 and 8 are side views of the conventional connections between enameled wires of electric motor windings and leads.
Figure 8:
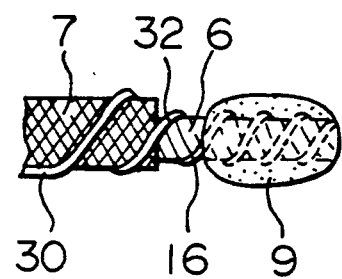

In the case of a connection 14-1 shown in FIG. 4, which is a modification of the connection 14, a brazing material 9 is brazed on an end portion of the exposed conductor 6 of the lead 7 wound around the exposed conductor 32 of the enamel wire 30, thereby fixing the exposed conductors 6 and 32 to each other. The modified connection 14-1 is the same as the connection 14 shown in FIG. 3 in other respects.

In the closed type compressor 23 constructed as described above, the crankshaft 19 is eccentrically rotated by the rotation of the electric motor 24, and the piston 17 thereby moves reciprocatively, so that a refrigerant gas is sucked into the cylinder 18 and is compressed therein. During the suction and compression strokes, vibrations occur and are transmitted to the closed casing 15, which thereby vibrates and generates noise. To prevent transmission of vibration and noise from the cylinder 18 to the casing 15, the springs 20 are provided at several places. However, since the springs 20 are provided, the electric motor 24 is easy to vibrate, so that the leads 7 are strongly vibrated.

In the electric motor 24 in accordance with the present invention, however, the connection strength of the connection 14 is so increased that there is no risk of breakage of the connection 14 or separation or disconnection of the conductor 6 of the leads 7 and the conductor 32 of the enameled wire 30 of the winding 12 at the connection 14, thus preventing occurrence of conduction failure at the connection 14.

An apparatus and a method for forming the connection 14 of the enameled wire 30 of the winding of the electric motor and the leads 7 will be described below with reference to FIGS. 9 and 9A.

Figure 9:
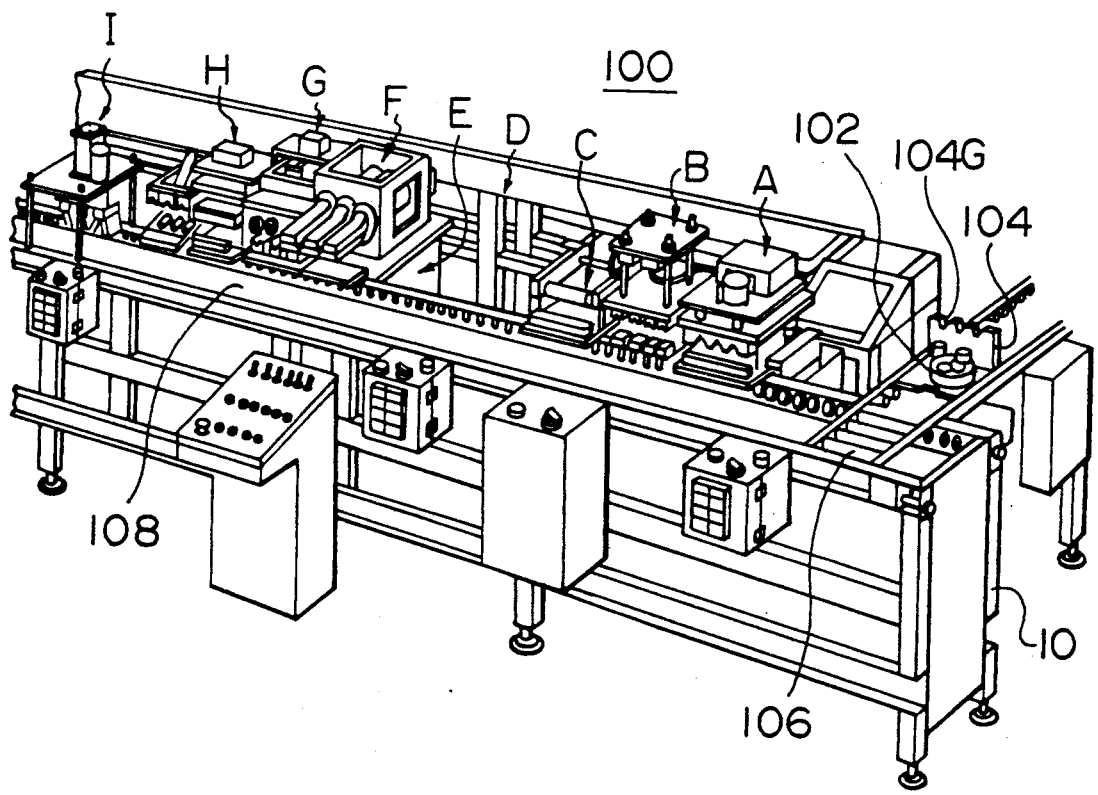
FIG. 9 is a perspective view of an embodiment of a connection apparatus for connecting the enameled wire of the electric motor winding and the lead in accordance with the present invention.
Figure 9A:
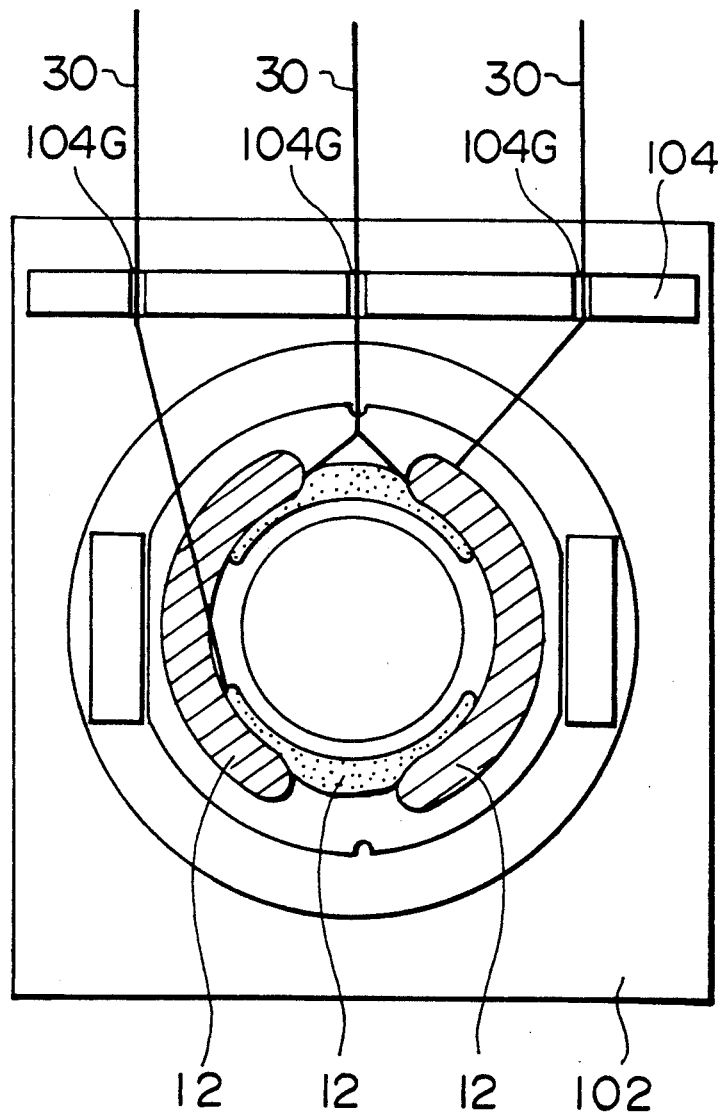
FIG. 9A is an enlarged top view of the carrier shown in FIG. 9 and the stator placed on the carrier.
Figure 10:
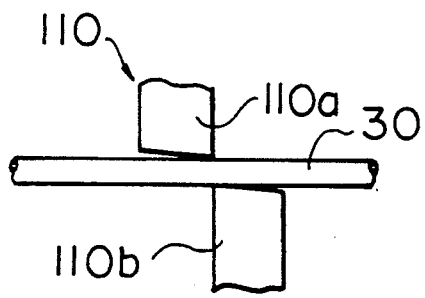
FIG. 10 is an enlarged fragmentary top view of a cutter for cutting and trimming up the end of the enameled wire.

A connection apparatus 100 shown in FIGS. 9 and 9A is designed to connect the leads 7 to enameled wires 30 forming the windings 12 of the stator 10 of the electric motor 24 described above. Three ends of the enameled wires 30 extend out of the windings 12 of the stator 10 of the electric motor 24. The stator 10 with the windings 12 wound on the stator core by a method which is known per se is placed on a carrier 102 and is transported to the connection apparatus 100 by a conveyor 106. As best shown in FIG. 9A, the carrier 102 has a wire holder 104 formed of an upright plate having three grooves 104G for receiving three end portions of the enameled wires 30, and each end portion of the enameled wires 30 is set in the corresponding one of the grooves 1-4G by an operator so as to protrude beyond the groove 104G to a certain extent. The carrier 102 on which the thus-prepared stator 10 is supported is placed on a second conveyor 108 perpendicular to the conveyor 106. The apparatus 100 has nine stations a to I arranged along the second conveyor 108. The conveyor 108 first conveys the carrier 102 to the station A where the end portions of the enameled wires 30 are cut b knife edges 110a and 110b of a cutter 110 (FIG. 10) to leave lengths of wire necessary to form connections to the leads 7.

Figure 11:
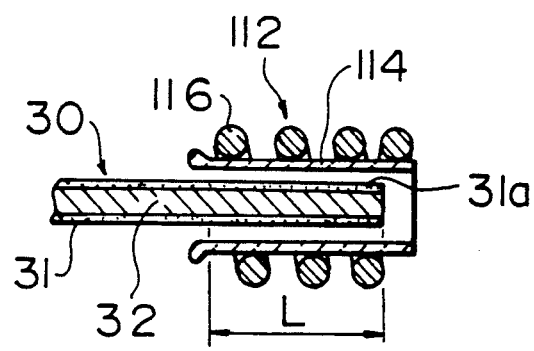
FIG. 11 is a sectional view of an induction coil for heating and separating the enamel coating of the enameled wire.
Figure 12:
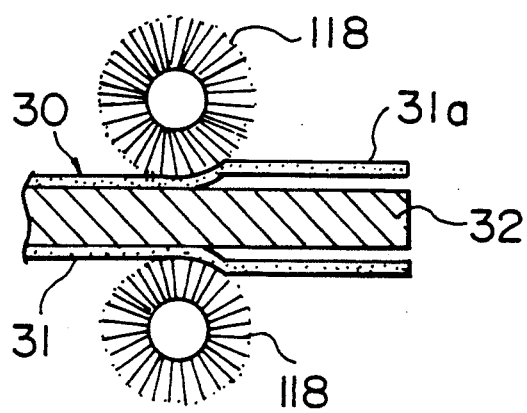
FIG. 12 is a side view of wire brushes for removing the separated enamel coating.

The carrier 102 is then transported to the station B where an insulating coating 31a of the end portion of each enameled wire 30 is separated by a high frequency unit 112 shown in FIG. 11. The unit 112 has a glass tube 114 and an induction coil 116 wound around the outer peripheral surface of the glass tube 114. The glass tube 114 on which the induction coil 116 is supported is moved to a position in which it receives each end portion of the enameled wire 30. A current of a high-frequency in the range of 5 KHz to 1 MHz is caused to flow through the induction coil 116. A high-frequency magnetic flux is thereby generated to heat the insulating coating 31a of the end portion of the enameled wire 30 to a temperature in the range of 200° to 300° C. The frequency of the current supplied to the induction coil 116 may vary depending on the diameter of the enameled wire 30 and is, preferably, 200 to 300 MHz for a wire diameter of the range of 0.5 to 1.0 mm. The enamel coating 31a of the enameled wire is swollen and softened by the induction heating and is separated from the conductor 32, as shown in FIG. 12. After the enamel coating has been separated in this manner, the carrier 102 is transported to the next station C.

Figure 13:
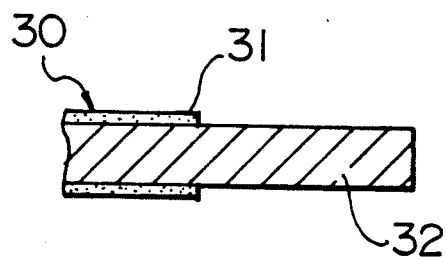
FIG. 13 is an enlarged longitudinal sectional side view of an exposed end portion of the enameled wire.

At the station C, the enamel coating 31a separated from the end portion of each enameled wire 30 supported on the wire holder 104 of the carrier 102 is removed by a plurality of wire brushes 118 shown in FIG. 12, so that the conductor 32 is exposed at the end of each enameled wire 30, as shown in FIG. 13. It has been verified by tests that the oxidation of the conductor 32 can be minimized by setting the frequency of the high-frequency current from the heating power source in the range of 5 k to 1 MHz so that the degree of heating of the conductor 32 can be reduced by virtue of the high-frequency skin effect. The temperature of the conductor 32 after the removal of the enamel insulating coating 31a can thereby be limited to a level at which there is no risk of a burn of the human body even if it is brought into contact with the conductor 32. Consequently, it is thereby possible to prevent oxidation of the exposed portion of the conductor 32. The length L of the separated enamel coating 31a can easily be adjusted with accuracy by selecting the length of the induction coil 116 or by controlling the position to which the portion of the enamel wire 30 to be stripped is inserted into the induction coil 116.

Figure 14:
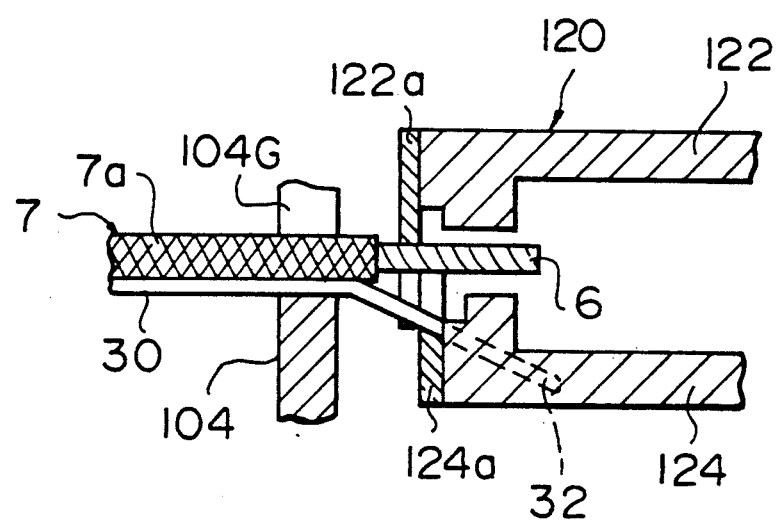
FIG. 14 is a longitudinal sectional side view of an enameled wire winding jig for winding the end portion of the enameled wire around an end portion of the lead.
Figure 15:
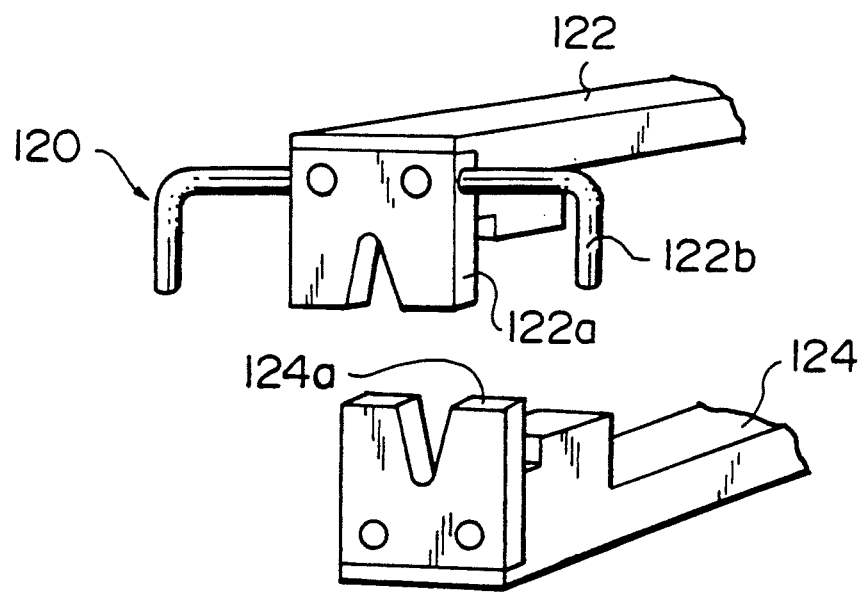
FIG. 15 is a perspective view of the upper and lower clamp arms of the enameled wire winding jig.
Figure 16:
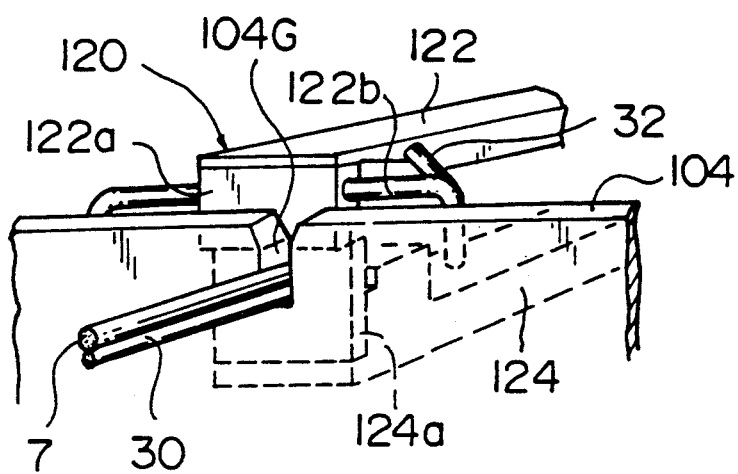
FIG. 16 is a fragmentary perspective view of the carrier and the enameled wire winding jig at the time of winding the enameled wire.

Next, the carrier 102 is transported to the station D where the a lead 7 (whose end is previously stripped of the insulating coating to expose the conductor 6) is set on the portion of the enameled wire 30 in each groove 104G of the wire holder 104 of the carrier 102 so as to be parallel to each enameled wire (see a left half section of FIG. 14). While maintaining this state, the carrier 102 is transported to the next station E where the exposed conductor 32 of each enameled wire 30 and the exposed conductor 6 of the lead 7 are loosely clamped by an enameled wire winding jig 120 shown in a right half section of FIG. 4 and in FIG. 15. The jig 120 has vertically movable upper and lower clamp arms 122 and 124 and V-shaped clamp claws 122a and 124a attached to the ends of the clamp arms 122 and 124, respectively. The two conductors 6 and 32 extend through V-shaped notches in the two clamp claws 122a and 124a. The free end of the exposed conductor 32 of the enameled wire 30 is bent upward to extend above the exposed conductor 6 of the lead 7 and is brought into engagement with an coil engagement arm 122b fixed to the upper clamp arm 122 (see FIG. 16). In this state, the upper and lower clamp arms 122 and 124 of the jig 120 are moved away from the wire holder 104 while being rotated on the axis of the lead 7. The enameled wire 30 is thereby wound around the outer peripheral surface of the insulating coating 7a of the lead 7.

Figure 17:
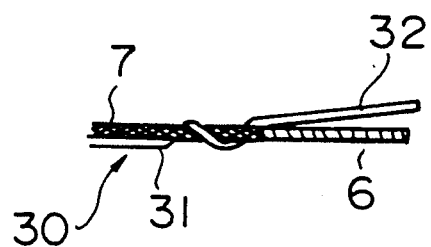
FIG. 17 is a side view of the lead and the enameled wire after the enameled wire has been wound around the lead and them shaped.

By this winding operation, the exposed conductor 6 of the enameled wire 30 is made generally perpendicular to the lead 7. However, this state is inconvenient for the next step. It is required that the conductor 32 is shaped such that the two conductors 6 and 32 extend generally parallel to each other, as shown in FIG. 17 For this purpose, the clamp claws 122a and 124a of the jig 122 are temporarily opened, the jig 122 is then made to advance toward the wire holder 104 again, the clamp claws 122a and 124a are closed again, and the jig 120 is moved backwardly while effecting the same rotation as before. By this operation, a portion of the enameled wire 30 in the vicinity of the boundary between the coating and the exposed conductor 30 is wound 1.5 times or more and the conductor 32 of the enameled wire 30 is shaped so as to be generally parallel to the conductor 6 of the lead 7 after the winding, as shown in FIG. 17.

Figure 18:
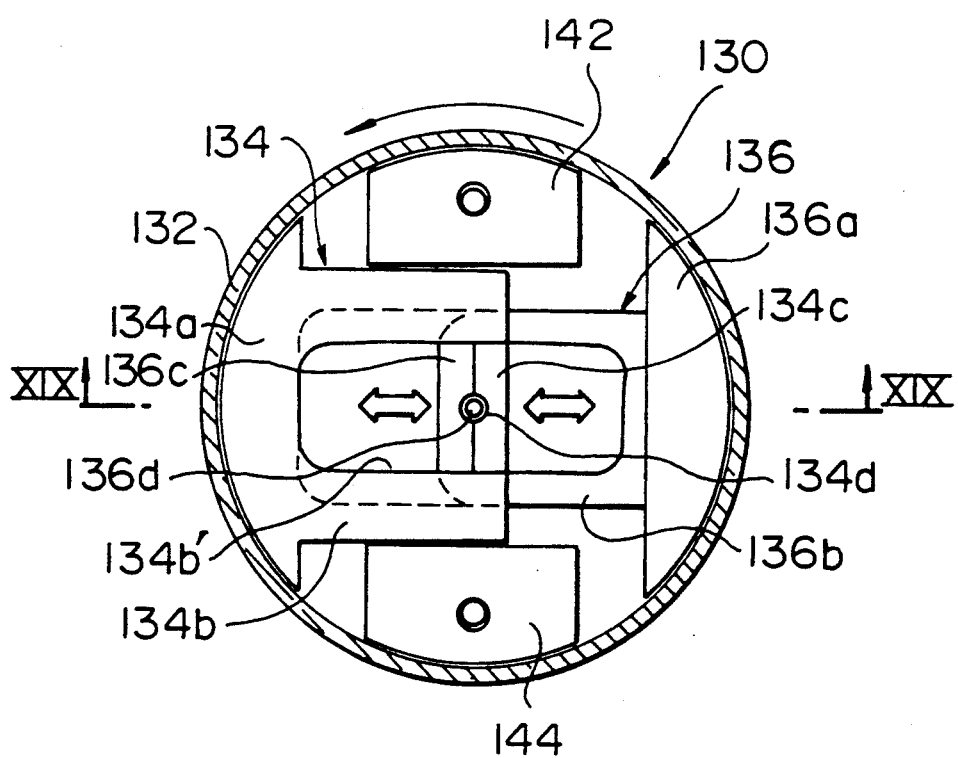
FIG. 18 is a transverse sectional view taken along the line XIX—XIX of FIG. 19, showing a lead twisting jig for winding the exposed end of the lead on the exposed end of the conductor of the enameled wire.
Figure 19:
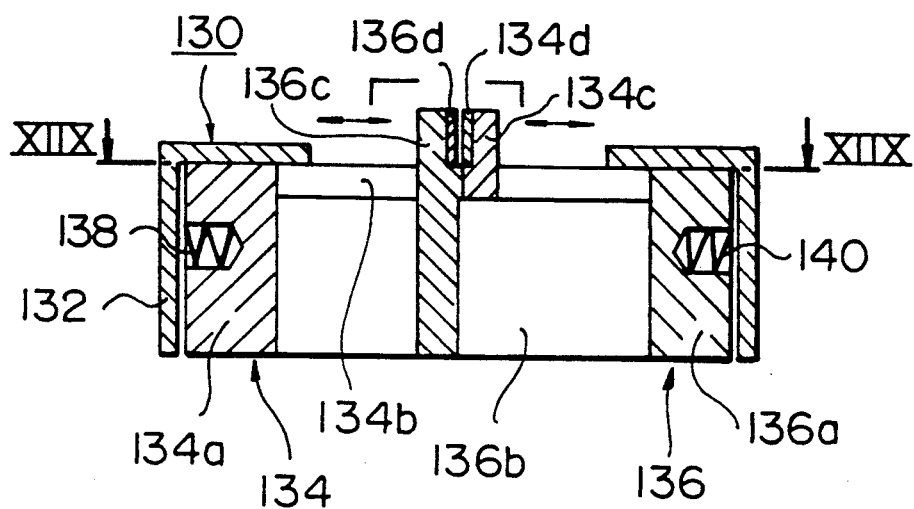
FIG. 19 is an axial sectional view taken along the XIX—XIX of FIG. 18 of the lead twisting jig.

Thereafter, the carrier 102 is transported from the station E to the station F where a generally cylindrical jig 130 such as that shown in FIGS. 18 and 19 is disposed. The jig 130 has a hollow outer cylindrical member 132, a pair of centrifugal clamp members 134 and 136 disposed in the outer cylindrical member 132 so as to be movable in the diametrically opposite directions of the outer cylinder 132, and a pair of compression springs 138 and 140 for radially inwardly moving the clamp members 134 and 136 apart from inner surfaces of the outer cylinder 132 when the jig 130 is not moved. The clamp members 134 and 136 respectively have bases 134a and 136a having arcuate outer surfaces capable of contacting the cylindrical inner surface of the outer cylinder 132, and overlapping portions 134b and 136b which project radially inwardly from the bases 134a and 136a and which overlap each other. At the ends of the overlapping portions 134b and 136b remote from the bases 134a and 136a, parallel projections 134c and 136c projecting in an axial direction of the jig are formed, as shown in FIG. 19. The projection 134c is closer to the base 136b than to the base 134b, while the projection 136c is closer to the case 134b than to the base 136b. An opening 134b' is formed in the overlapping portion 134b. The projection 136c projects forwardly through the opening 134b'. Springs 134d and 136d are attached to the opposed surfaces of these projections. The two projections 134a and 136c are positioned so as to be spaced from each other in the diametric direction of the outer cylinder 132 when the jig 130 is not moved. When the jig 130 is rotated on the axis of the outer cylinder 132, a centrifugal force acts on the two clamp members 134 and 136 to move these members radially outwardly against the forces of the springs 138 and 140, so that the two projections 134c and 136c are moved so as to become closer to each other and the springs 134d and 136d are correspondingly moved closer to each other. Guides 142 and 144 for guiding such radial movement of the two clamp members 134 and 136 are disposed in the outer cylinder 132 at a distance from each other.

At the station F, the two conductors 6 and 32 shaped as described above and shown in FIG. 17 are received between the two springs 134d and 136d of the clamp members 134 and 136 spaced from each other as described above. This reception is achieved by moving the jig 130 toward the wire holder 104 of the carrier 102. The jig 130 is then rotated at a speed of about 2,000 rpm, the clamp members 134 and 136 are moved outwardly by the centrifugal force, and the springs 134d and 136d are moved closer to each other to elastically grip the two conductors 6 and 32. The jig 130 is then moved backwardly while rotating. The two conductors 6 and 32 are thereby twisted while being rubbed by the springs 134d and 136d, so that the multiplicity of fine wires of the conductor 6 of the lead 7 thinner than the conductor 32 of the enameled wire 30 are wound around the conductor 32 of the enameled wire 30. The rotational speed of the jig 130 can be controlled so as to prevent the fine wires of the conductor 6 of the lead 7 from being broken by the rubbing. Preferably, the speed at which the jig 130 is backwardly moved is selected such that the fine wires of the conductor 6 of the lead 7 are wound around the conductor 32 of the enameled wire 30 at a high density.

Next, the carrier 102 is transported to the station G where end portions of the conductor 32 of each enameled wire 30 and the conductor 6 of the lead 7 wound around the conductor 32 are cut to trim up the ends of these conductors. This cutting is performed with a cutter (not shown) similar to the cutter 110 provided in the station A.

Figure 20:
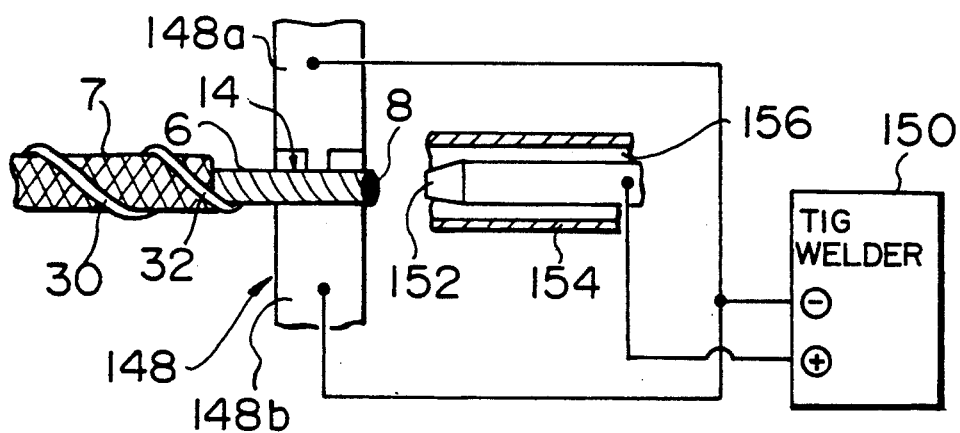
FIG. 20 is a block diagram of a TIG welding unit.

Next, the carrier 102 is transported to the station H where the trimmed ends of the two conductors 6 and 32 are welded together by a TIG welding unit 150 shown in FIG. 20, thereby completing the connection 14 described above with reference to FIG. 3. The conductor 32 of the enameled wire 30 and the conductor 6 of the lead 7 wound round the conductor 32 are held by the two clamp members 148a and 148b of the clamp 148. A tungsten electrode 152 of the welding unit 150 is disposed so that its end surface faces the cut ends of the conductor 6 and 32 held by the clamp 148. The electrode 152 is encircled by a hollow holder 154 such that a gas supply gap 156 is formed therebetween through which Ar gas is supplied during welding. The electrode 152 is connected to a positive terminal of the welding unit 150 while the clamp members 148a and 148b are connected to a negative terminal.

To ensure the desired reliability of the connection 14 and, hence, to obtain a necessary connection strength of the connection 14, it is necessary to control welding conditions. For this control, it is preferable to set the distance between the end extremity of the connection 14 and the tungsten electrode 152 to a range of 1 to 7 mm. It has been found by experiment that it is preferable to set the diameter of the end face of the tungsten electrode 152 to a range of 15 to 80% of the diameter of a base portion of the tungsten electrode 152. Also, electric power is supplied to the welded connection 14 from both the clamp members 148a and 148b of the clamp 148. The desired welding conditions can thereby be established. Satisfying these conditions, Ar gas is supplied during welding to the end extremity of the connection 14 at a small rate and an arc is generated between the ends of the tungsten electrode 152 and the connection 14. The extreme end of the connection 14 is thereby melted, so that the materials the conductor 32 of the enameled wire 30 and the conductor 6 of the lead 7 are melted and mixed and bonded together. Consequently, the connection 14 is formed to have a sufficiently high connection strength, and the conductors are connected without being oxidized, thus achieving a connection having an improved reliability.

The carrier 102 is finally transported to the station I where the electrical conduction between each enameled wire 30 and the associated lead 7 is tested to check the reliability of the connection 14 completed at the station H. This test is performed in such a manner that the connection 14 is vibrated while being clamped and the electrical resistance of the connection is measured under this condition. The conduction test is thereby performed with reliability, whereby the electric motor having connections 14 tested in this manner provides a high operation reliability.

The above-described apparatus and method are used to form the connection 14 shown in FIG. 3. To form the connection 14-1 shown in FIG. 4, a soldering step may be performed in place of the TIG welding step at the station H of the connection apparatus shown in FIG. 9. The apparatus can easily be changed to perform this soldering step by replacing the TIG welding unit 150 shown in FIG. 20 with a well known conventional soldering unit. Such modification of the apparatus using a soldering unit will not be described below since such replacement is apparent to those skilled in the art.

What is claimed is:

1. A method of manufacturing an electric motor comprising the steps of:
    preparing at least one winding formed of an enameled wire having a first conductor and an insulating enamel coating on an outer peripheral surface of the conductor;
    preparing a lead for electrically connecting an end of the enameled wire to a terminal of the motor, the lead having a second conductor and an insulating layer formed on an outer peripheral surface of the second conductor, the insulating layer being removed at an end of the lead so that an end portion of the second conductor is exposed;
    heating the enamel coating on the end portion of the enameled wire of the winding by a high-frequency current to separate the enamel coating on the end portion from the first conductor;
    removing the thus separated enamel coating to expose the corresponding end portion of the first conductor;
    winding the exposed end portion of the second conductor around an outer peripheral surface of the exposed end portion of the first conductor to form a connection between the enameled wire and the lead; and
    bonding the first and second conductors at said connection by one of welding and soldering.

2. A method according to claim 1, wherein said first and second conductors are bonded together at an extreme end of said connection by TIG welding.

3. A method according to claim 1, wherein a portion of said enameled wire adjacent to said connection is wound around the outer peripheral surface of said insulating layer of said lead to form at least one turn thereon.

4. A method according to claim 2, wherein a portion of said enameled wire adjacent to said connection is wound around the outer peripheral surface of said insulating layer of said lead to form at least one turn thereon.

5. A method according to claim 1, wherein the frequency of the high-frequency current is within the range of 5 KHz to 1 MHz.

6. A method according to claim 2, wherein the TIG welding is conducted such that an extreme end of a tungsten electrode used for the TIG welding is spaced from adjacent end of said connection by a distance of 2 to 7 mm.

7. A method according to claim 1, wherein a test relating to the reliability of the connection is performed after the connecting step.

8. A method according to claim 1, wherein said enamel coating on the end portion of the enameled wire is heated to a temperature ranging from 200° to 30° C.

9. A method of manufacturing an electric motor, comprising the steps of:
    preparing at least one winding formed of an enameled wire comprising a first conductor and an insulating enamel coating on an outer peripheral surface of the first conductor;
    preparing a lead for electrically connecting an end of the enameled wire to a terminal of the motor, the lead comprising a second conductor and an insulating layer formed on an outer peripheral surface of the second conductor, the insulating layer being removed at an end of the lead so that an end portion of the second conductor is exposed;
    placing an end portion of the enameled wire of the winding in a high-frequency magnetic flux generated by a high-frequency current flowing through an induction coil to heat the insulating enamel coating on the end portion of the enameled wire and thus separate the thus heated enamel coating from the first conductor;
    removing the separated enamel coating to expose a corresponding end portion of the first conductor;
    winding the exposed end portion of the second conductor around an outer peripheral surface of the exposed end portion of the first conductor to form a connection between the enameled wire and the lead; and
    bonding the first and second conductors at said connection by one of welding and soldering.

* * * * *